United States Patent
Brekke

(10) Patent No.: US 10,823,218 B2
(45) Date of Patent: Nov. 3, 2020

(54) HIGH STRENGTH SCREW

(71) Applicant: Columbia Insurance Company, Omaha, NE (US)

(72) Inventor: Steven Brekke, Lakeville, MN (US)

(73) Assignee: Columbia Insurance Company, Omaha, NE (US)

( * ) Notice: Subject to any disclaimer, the term of this patent is extended or adjusted under 35 U.S.C. 154(b) by 257 days.

(21) Appl. No.: 15/894,653

(22) Filed: Feb. 12, 2018

(65) Prior Publication Data

US 2019/0249705 A1    Aug. 15, 2019

(51) Int. Cl.
*F16B 25/00* (2006.01)
*F16B 25/10* (2006.01)

(52) U.S. Cl.
CPC ...... *F16B 25/0057* (2013.01); *F16B 25/0015* (2013.01); *F16B 25/103* (2013.01)

(58) Field of Classification Search
CPC . F16B 25/0015; F16B 25/0057; F16B 5/0275
USPC .......................................... 411/411, 412, 414
See application file for complete search history.

(56) References Cited

U.S. PATENT DOCUMENTS

| | | | |
|---|---|---|---|
| RE28,111 E * | 8/1974 | Laverty | F16B 25/0031 411/412 |
| 4,175,555 A * | 11/1979 | Herbert | F16B 5/0275 606/304 |
| 5,019,079 A * | 5/1991 | Ross | A61B 17/863 411/389 |
| 5,570,983 A | 11/1996 | Hollander | |
| 6,000,892 A | 12/1999 | Takasaki | |
| 7,021,877 B2 | 4/2006 | Birkelbach et al. | |
| 7,037,059 B2 * | 5/2006 | Dicke | F16B 5/0275 411/399 |
| 7,322,983 B2 | 1/2008 | Harris | |

(Continued)

OTHER PUBLICATIONS

Simpson Strong-Tie® Fastening Systems, Interior Wood Screws, SDWC Truss Screw, C-F-2017 © 2017 Simpson Strong-Tie Company Inc., at least as early as Oct. 18, 2017, 1 pg.

(Continued)

*Primary Examiner* — Flemming Saether
(74) *Attorney, Agent, or Firm* — Stinson LLP

(57) ABSTRACT

A screw with an asymmetrical thread for securing wooden members together is disclosed. The screw includes a shaft with a head at one end and a tip at the other end. A continuous asymmetrical thread extends along the shaft. The asymmetrical thread has a front surface facing the tip and a rear surface facing the head, the front and rear surfaces each having an angle relative to a plane normal to the shaft. The asymmetrical thread has a first section and a second section. The portion of asymmetrical thread in the first section has front and rear surfaces of first angles with respect to the plane normal to the shaft. The portion of asymmetrical thread in the second section has front and rear surfaces of second angles different than the first angles. The asymmetrical thread includes a transition portion between the first and second sections. The transition portion is positioned along the shaft such that the transition portion is located proximate the interface of the wooden members when the screw secures the wooden frame members together and the head of the screw engages the first of the wooden members.

18 Claims, 6 Drawing Sheets

(56) References Cited

U.S. PATENT DOCUMENTS

| | | | |
|---|---|---|---|
| 7,682,118 B2 | 3/2010 | Gong et al. | |
| 7,988,396 B2 * | 8/2011 | Weiss | F16B 25/0031 |
| | | | 411/386 |
| 8,104,248 B2 * | 1/2012 | Gillis | B25B 13/48 |
| | | | 52/745.05 |
| 8,147,531 B2 * | 4/2012 | Corrao | A61B 17/863 |
| | | | 411/244 |
| 8,348,571 B2 | 1/2013 | Shih | |
| 8,926,249 B2 | 1/2015 | Lin | |
| 9,103,364 B2 * | 8/2015 | Lin | F16B 25/0057 |
| 9,234,539 B2 * | 1/2016 | Gonciarz | F16B 25/0063 |
| 9,291,183 B2 | 3/2016 | Litzinger | |
| 9,297,402 B2 | 3/2016 | Hughes | |
| 9,472,865 B2 | 10/2016 | Frank | |
| 2008/0118332 A1 * | 5/2008 | Lamb | F16B 5/0275 |
| | | | 411/411 |
| 2013/0039720 A1 | 2/2013 | Shih | |

OTHER PUBLICATIONS

Information page and drawing of prior art composite deck screw, at least as early as Aug. 28, 2017, 1 pg.

Timberlok® Fastener Drawings, at least as early as Oct. 18, 2017, 1 pg.

* cited by examiner

HIGH STRENGTH SCREW

FIELD OF THE INVENTION

The present invention generally relates to a screw, and more specifically, to a screw with a changing thread profile to increase the withdrawal capacity of the screw.

BACKGROUND

There are many uses for screws in the construction and carpentry fields. Typically, screws are used to connect two or more wooden members together. The strength of the connection between the wooden members provided by the screw is measured in terms of withdrawal capacity: the amount of force required to remove the screw from the member. In certain circumstances, it is preferable for the screws to provide a strong connection between the wooden members. For example, building codes require the structural connection between wooden components, such as a top plate of a wall and a roof truss, to meet certain structural strength requirements. In High Velocity Hurricane Zones, building codes require each connection between the top of a wall and the roof to have a minimum uplift strength of 700 lbs. However, a single conventional screw does not have a sufficient withdrawal capacity to meet this minimum strength requirement in High Velocity Hurricane Zones (i.e. the withdrawal capacity of conventional screws is less than 700 lbs.). Therefore, when screws are used in High Velocity Hurricane Zones to connect the top plate of a wall to the roof truss, more than one screw or additional connection components, such as metal straps, are required to generate a connection with the required strength.

SUMMARY

In one aspect, an asymmetrical screw is disclosed for securing two wooden members together so that the wooden members meet at an interface through which the screw extends. The screw includes a shaft with a proximal end and a distal end, a head at the proximal end of the shaft configured to accept a tool to rotate the shaft, and a tip at the distal end of the shaft. The screw also includes a continuous asymmetrical thread on the shaft having a front surface facing the tip and a rear surface facing the head, the front and rear surfaces each having an angle relative to a plane normal to the shaft. The asymmetrical thread includes a first section including a portion of the thread having front and rear surfaces of first angles with respect to the plane normal to the shaft and a second section including a portion of the thread having front and rear surfaces of second angles different than the first angles of the first section of the thread. The asymmetrical thread includes a transition portion between the first and second sections. The transition portion is positioned along the shaft such that the transition portion is located proximate the interface of the two wooden members when the screw secures the wooden frame members together and the head of the screw engages the first of the wooden members.

In another aspect, a method of making a screw for securing two members together that meet each other at an interface in a specific application. The method comprises providing a shaft having a head at a proximal end of the shaft configured to receive a driver for driving the screw into the members and a tip at a distal end of the shaft. Providing an interface location from dimensions of the two members and their relative orientation when connected together. Forming an asymmetrical thread on the shaft. The asymmetrical thread having a front surface facing the tip and a rear surface facing the head, the front and rear surfaces each having an angle relative to a plane normal to the shaft. The asymmetrical thread including a first section having front and rear surfaces of first angles with respect to the plane normal to the shaft and a second section having front and rear surfaces of second angles different than the first angles of the first section of the thread. The asymmetrical thread including a transition portion between the first and second sections. Where forming the asymmetrical thread comprises positioning the transition portion according to the interface location so that upon driving the screw into the two members so that the head contacts one of the two members, the transition portion is proximate the interface location.

DETAILED DESCRIPTION

Figure 1:
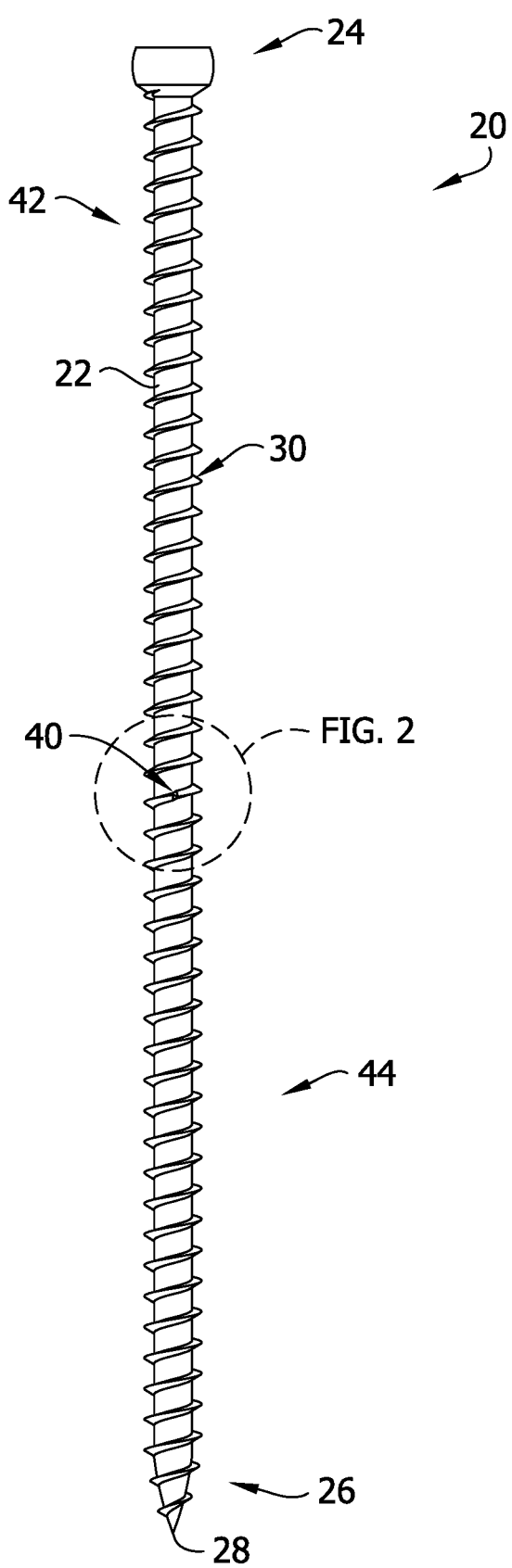
FIG. 1 is a front view of a screw according to a first embodiment of the present disclosure.

Referring to FIG. 1, a screw of a first embodiment of the present disclosure is generally indicated at 20. The screw 20 includes an asymmetrical thread 30. As described in more detail below, the asymmetrical thread 30 has a profile that changes at the intersection of two wooden members, thereby increasing the strength of the connection provided by the screw (withdrawal capacity). For the purposes of the description, the direction in which the screw 20 is installed or driven into a member is the driven direction. The direction opposite the driven direction, the direction in which the screw 20 is removed or withdrawn from a member, is the withdrawal direction.

Figure 2:
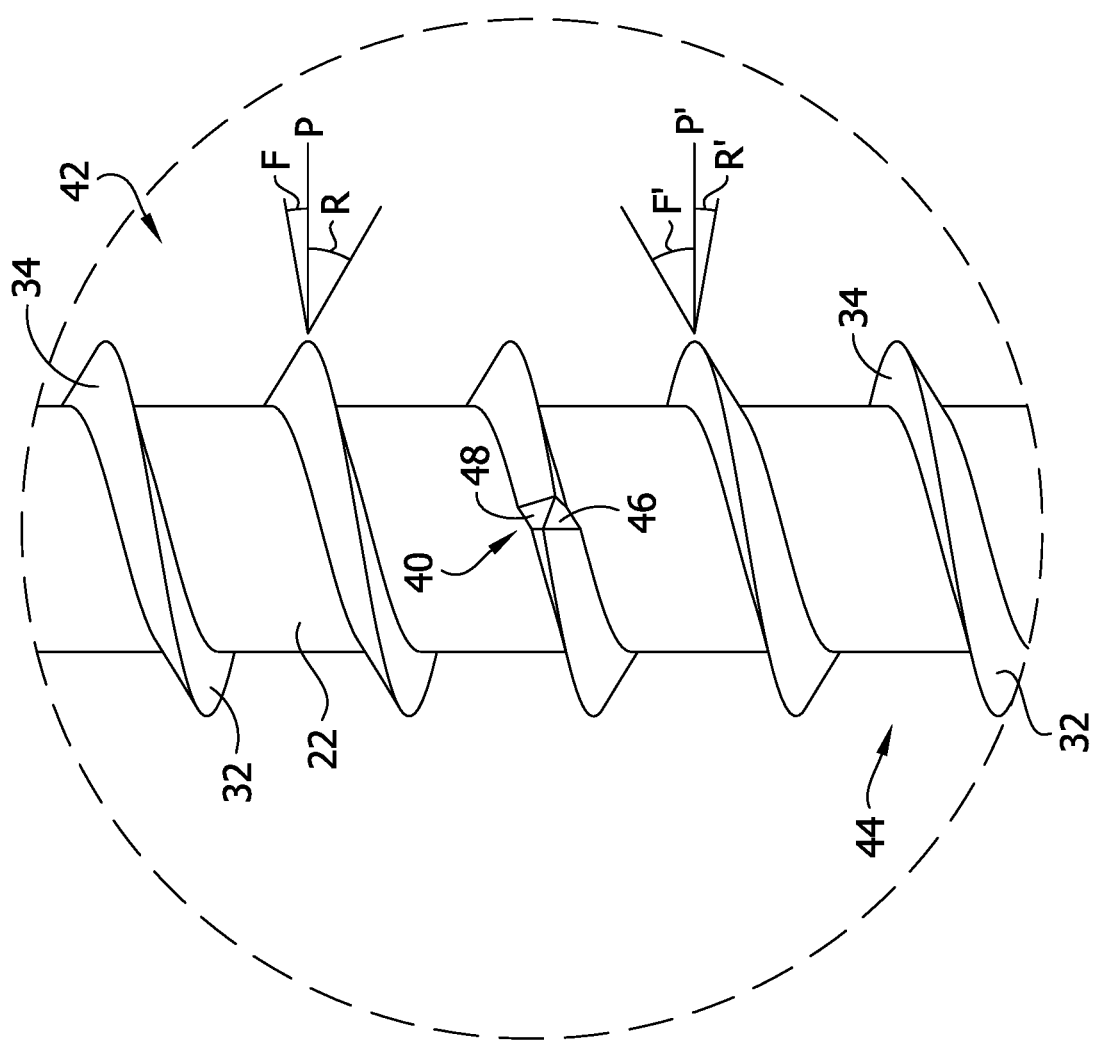
FIG. 2 is an enlarged detail view of the screw as indicated in FIG. 1.

Referring to FIGS. 1 and 2, the screw 20 of the first embodiment of the present disclosure includes a shaft 22 with a proximal end and a distal end. A head 24 is fixed to the distal end of the shaft 22. The head 24 includes a tool engagement portion (not shown) as known in the art and therefore the detailed description is omitted here. The tool engagement portion of the head 24 is configured to accept or mesh with a tool, such as a bit of a drill (not shown), to rotate the screw. A conical shaped tip 26 is fixed to the proximal end of the shaft 22, opposite the head 24. As known in the art, the tip 26 tapers the shaft 22 to a point 28 that facilitates the driving of the screw into a wooden member.

The screw 20 includes a single, continuous asymmetrical thread 30. The asymmetrical thread 30 runs along the shaft 22 from the point 28 to the base of the head 24. The asymmetrical thread 30 includes a front surface 32 and a rear surface 34 (FIG. 2). The front surface 32 of the thread 30 faces the tip 26. The rear surface 34 of the thread 30 faces the head 24. The front surface 32 is inclined at an angle relative to a plane normal to the shaft 22. The rear surface 34 is inclined at an angle relative to the plane normal to the shaft 22. The thread 30 is asymmetrical in the sense that the angle F of the front surface 32 and the angle R of the rear surface 34 are different. Accordingly, the thread 30 has an asymmetrical cross section. In one embodiment, the pitch of the thread 30 is constant over the entire length of the shaft 22.

The single, continuous asymmetrical thread 30 has a first section 42, a second section 44 and a transition portion 40. The first section 42 is located adjacent or near the head 24 of the screw 20 and extends along the shaft 22 toward the tip 26. The second section 44 is located adjacent or near the tip 26 of the screw 20 and extends along the shaft 22 toward the head 24. The transition portion 40 is located at the intersection of the first and second sections 42, 44 of the asymmetrical thread 30 and joins the first and second sections together. As seen in FIG. 1, the thread 30 in the second section 44 also extends along the tip 26 toward the point 28. The profile of the asymmetrical thread 30 is different in the first and second sections 42, 44. In the first section 42, the asymmetrical thread 30 is arranged to resist the movement of the screw 20 relative to the member in the driven direction. In the second section 44, the asymmetrical thread 30 is arranged to resist the movement of the screw 20 relative to the member in the withdrawal direction. Although the profile of the thread 30 changes, it always extends in the same direction along a continuous spiral.

Referring to FIG. 2, the front and rear surfaces 32, 34 of the portion of asymmetrical thread 30 in the first section 42 are inclined at a first set of angles F, R, with respect to the plane P normal to the shaft 22. In the first section 42, the front surface 32 is inclined at an angle F in an inclusive range anywhere between 0° and 20° and more preferably at 10°. The rear surface 34 is inclined at an angle R in an inclusive range anywhere between 20° and 40°, and more preferably at 30°. In the second section 44, the front and rear surfaces 32, 34 of the asymmetrical thread 30 are inclined at a second set of angles F', R', with respect to the plane P' normal to the shaft 22. The first set of angles F, R, of the front and rear surfaces 32, 34 in the first section 42 are different from the second set of angle F', R' of the front and rear surfaces in the second section 44. In the second section 44, the front surface 32 is inclined at an angle F' in an inclusive range anywhere between 20° and 40°, and more preferably at 30°. The rear surface 34 is inclined at an angle R' in an inclusive range anywhere between 0° and 20°, and more preferably at 10°. In this manner, the flatter or more inclined surfaces of the thread 30 in the first and second sections 42, 44 face in opposing directions. In the illustrated embodiment, the angles F, R of the front and rear surfaces 32, 34 in the first section 42 are 10° and 30°, respectively. The angles F', R' of the front and rear surfaces 32, 34 in the second section 44 are 30° and 10°, respectively. Thus, in the illustrated embodiment, the profile of the thread 30 in the first section 42 is opposite the profile of the thread in the second section 44. The larger incline angle of the front or rear surface 32, 34 in each section 42, 44 ensures the asymmetrical thread 30 will not fail under the stress of the withdrawal forces placed on the screw. The larger incline angle provides a sufficient thickness in the asymmetrical thread 30 (between the front and rear surfaces 32, 34), and, thereby, gives the thread a sufficient strength such that the thread will not bend when loaded in withdrawal.

The transition portion 40 lies between and separates the first and second sections 42, 44 of the asymmetrical thread 30. The transition portion 40 is positioned along the shaft 22 and, as shown in FIG. 2, is relatively short in length compared to the circumference of the shaft measured at the radially outermost extend of the threads 30. In one embodiment, the circumferential extent of the transition portion 40 is less than ¼ of the circumference of the shaft 22; more preferably less than ⅛ of the circumference and most preferably less than 1/16 of the circumference. The transition portion 40 includes front and rear transition surfaces 46, 48 located on the front and rear surface 32, 34, respectively. The front and rear transition surfaces 46, 48 provide a smooth transition between the changing asymmetrical thread 30 profiles of the first and second sections 42, 44. The front transition surface 46 spans between and interconnects the front surfaces 32 of the first and second sections 42, 44. The rear transition surface 48 spans between and interconnects the rear surfaces 34 of the first and second sections 42, 44. The front and rear transition surfaces 46, 48 may be generally flat or may have some curvature.

Figure 3A:
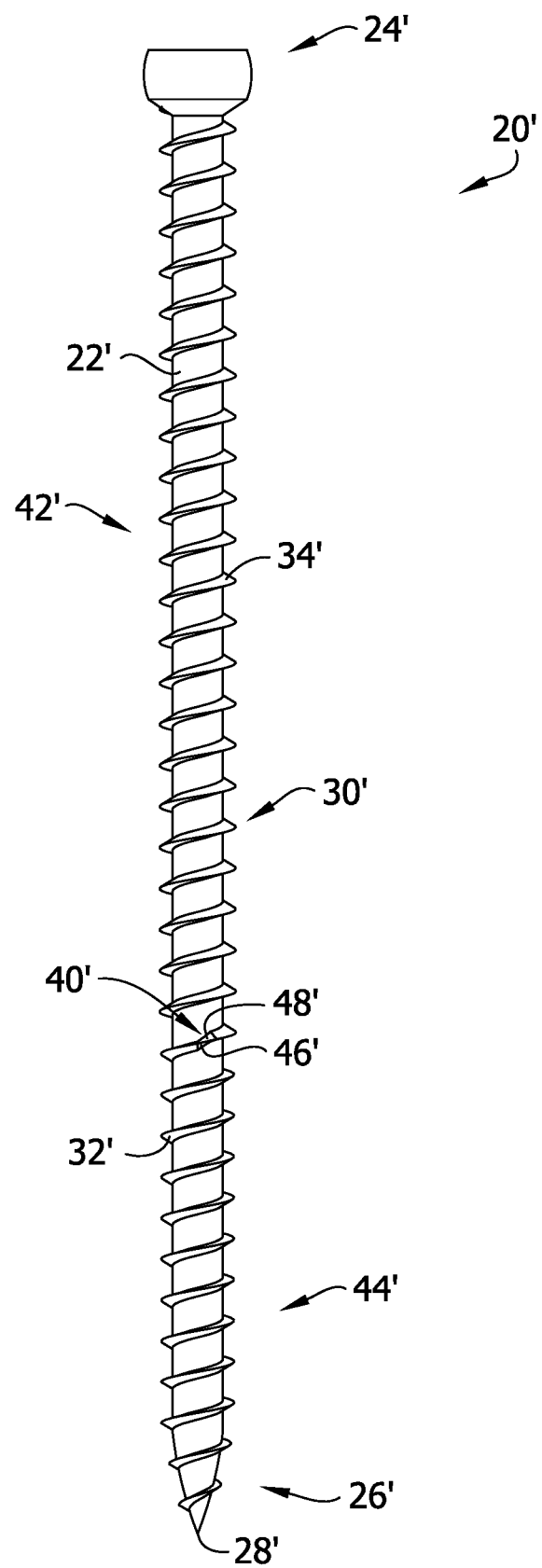
FIG. 3A is a front view of a screw according to a second embodiment of the present disclosure.
Figure 3B:
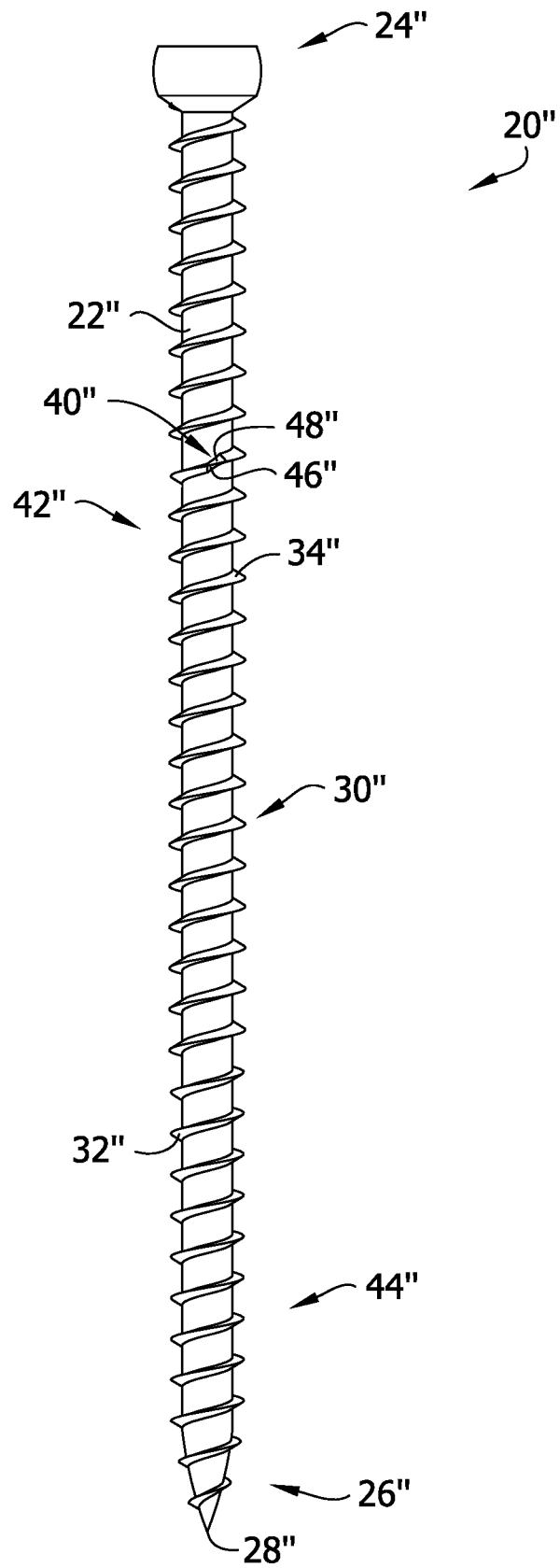
FIG. 3B is a front view of a screw according to a third embodiment of the present disclosure.

The transition portion 40 of the screw 20 is positioned along the shaft 22 such that the transition portion is located proximate the interface of the wooden members when the screw secures the members together and the head 24 of the screw engages one of the wooden members. The screw 20 may be formed with the transition portion 40 positioned anywhere along the shaft 22 to correspond to the size of the members being connected by the screw 20. In one embodiment, the transition portion 40 is located on the shaft 22 such that the length of the first and second sections 42, 44 along the shaft is at least ¼ of the total length of the screw 20. The total length of the screw 20 is measured from the top surface of the head 24 to the point 28 of the tip 26. This ensures an appropriate amount of asymmetrical thread 30 in each of the first and second sections 42, 44 will engage each wood member the screw is driven into to provide the increased connection strength (withdrawal capacity), as described below. In the illustrated embodiment shown in FIG. 1, the transition portion 40 is positioned 3 inches (7.6 cm) from the head 24 on the shaft 22 corresponding to the midpoint of the screw 20 (the screw is 6 inches (15.2 cm) long). In another embodiment, the transition portion 40 is located closer to the tip 26 of the screw 20 than the head 24. An example of such a screw is generally indicated at 20' in FIG. 3A. The screw 20' is generally the same as screw 20 in FIG. 1 so that corresponding parts are labeled with the same reference numerals, with the addition of a trailing prime. In the FIG. 3A embodiment, the screw 20' is shorter (screw 20' is 4.5 inches (11.4 cm) long). The transition portion 40' is still positioned 3 inches (7.6 cm) from the head 24', except now the transition portion is located 1.5 inches (3.8 cm) from the tip 26'. The screws 20, 20' may have other constructions than described herein, such as the screw having a different length or the transition portion located at a different position along the shaft (e.g. nearer to the head 24 than the tip 26), that are within the scope of the present invention. An example of such a screw is generally indicated at 20" in FIG. 3B. The screw 20" is generally the same as screw 20 in FIG. 1 so that corresponding parts are labeled with the same reference numerals, with the addition of a trailing double prime. In the FIG. 3B embodiment, the transition portion 40" of the screw 20" is located closer to the head 24" than the tip 26".

The screws 20, 20', as described above, offer a significant advantage over known screws. The changing profile of the asymmetrical thread 30 between the first and second sections 32, 34 increases the strength of the connection made by the screw 20. In particular, the change in the profile of the asymmetrical thread 30 increases the withdrawal capacity, the force required to remove a screw from one or more members, in both the driven and withdrawal directions. To provide sufficient resistance to movement and thereby increase the withdrawal capacity of the screw 20, the surface of the thread 30 resisting movement must have an incline angle less than 20°, relative to a plane P normal to the shaft 22 of the screw. This 20° angle is based upon a wood-to-metal coefficient of static friction of approximately 0.30. If the incline angle is less than 20° the surface of the thread 30 resisting movement grips the wood fibers of the wooden member, increasing the withdrawal capacity (greater resistance to movement). However, if the incline angle is 20° or greater, the wood fibers can slide over the thread 30 of the screw 20, resulting in a lower withdrawal capacity (lower resistance to movement). In the first section 42, the front face 32 of the asymmetrical thread 30 is inclined at an angle F of less than 20° to resist the movement of the screw 20 relative to the member in the driven direction (i.e. prevent the screw from being pulled through the member). In addition, it is appreciated that the head 24 of the screw 20 will also provide some resistance to the movement of the screw 20 in the driven direction. Thus, both the head 24 and the first section 42 of asymmetrical thread 30 resist the movement of the screw 20 in the driven direction. In the second section 44, the rear surface 34 is inclined at an angle R' of less than 20° to resist the movement of the screw 20 relative to the member in the withdrawal direction (i.e. prevent the screw from being pulled out of the member). This configuration results in the screw 20 having the surface of the thread 30 resisting movement in the first and second sections 32, 34 face towards one another (i.e. face the transition portion 40).

By positioning the transition portion 40 proximate the intersection of two wooden members connected by the screw 20, the orientation of the asymmetrical thread 30 in the first and second sections 42, 44 strongly resists the separation of the two members. In particular, when the transition portion 40 is located at or near the intersection of the two wooden members connected by the screw, at least a majority of the asymmetrical thread 30 of the first section 42 is disposed within a first of the wooden members and at least a majority of the asymmetrical thread of the second section 44 is disposed within a second of the wooden members. This arrangement results in the portion of asymmetrical thread 30 of the first section 42 resisting movement of the first wooden member in the withdrawal direction. Likewise, the portion of asymmetrical thread 30 of the second section 44 resists movement of the second wooden member in the driven direction. In other words, the asymmetrical thread 30 in the first section 42 provides greater resistance to the screw 20 being pulled through the first wooden member and the asymmetrical thread in the second section 44 provides greater resistance to the screw being pulled out of the second member.

Figure 5:
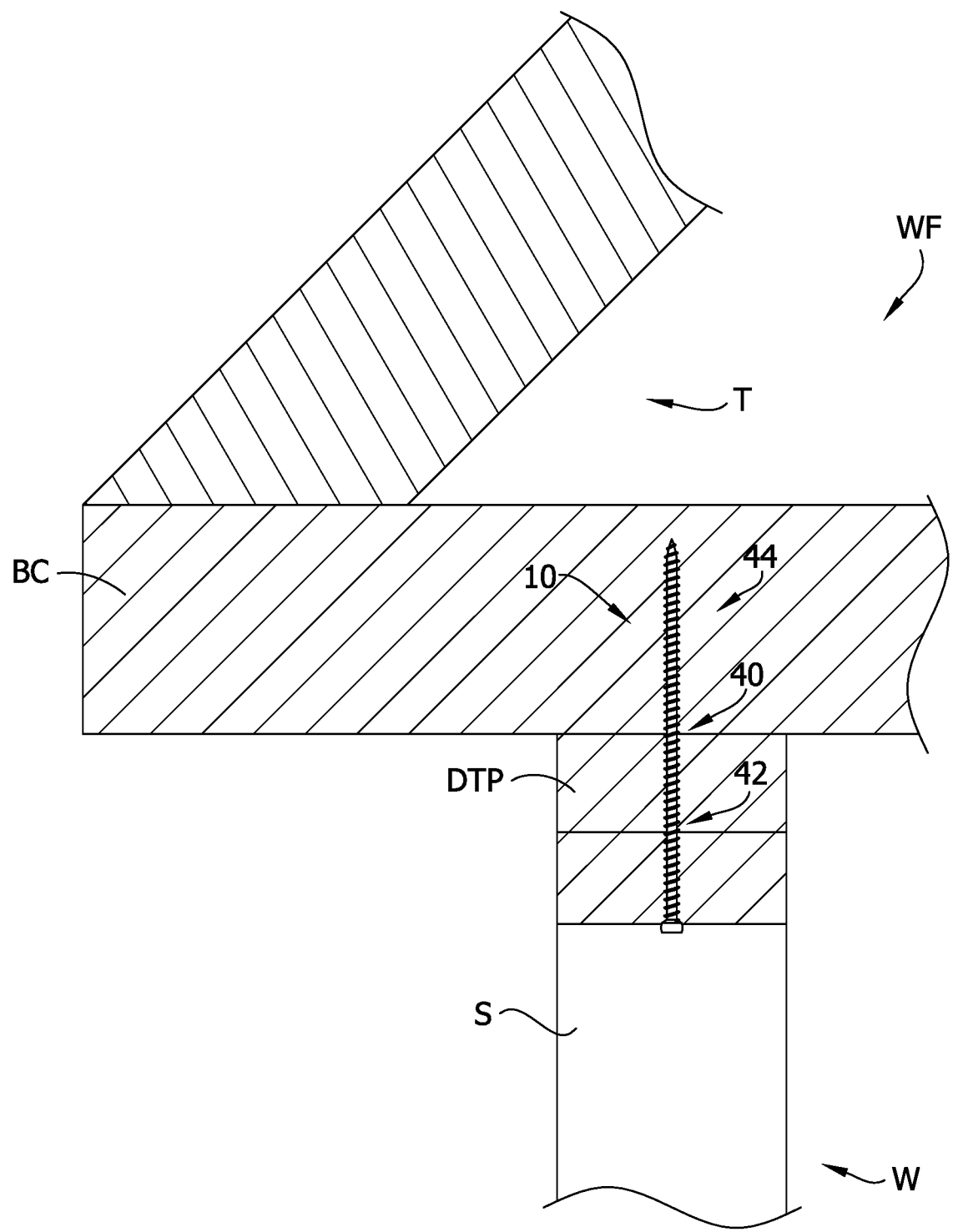
FIG. 5 is a schematic view of the screw of FIG. 1 in wood frame construction; and Corresponding reference characters indicate corresponding parts throughout the drawings.

Table 1 below shows the results of several uplift load (withdrawal capacity) tests conducted with screws 20, as described above. The tests were conducted in accordance with appropriate International Code Council Evaluation Service (ICC-ES) and ASTM standards. The tests were configured to determine the connection strength (withdrawal capacity) between a double top plate DTP secured to a bottom chord BC of a roof truss T using a single screw 20, as shown in FIG. 5. For each test, a Douglas Fir-Larch (DFL) lumber chord was connected, at the midpoint, above a double DFL top plate extending generally perpendicular to the chord. A single screw 20, as described above, was used to connect the double DFL top plate to the bottom of the chord. The screw 20 was generally vertical with the transition portion 40 located proximate the intersection of the double DFL top plate and the chord. An upward load was then applied to the chord to pull the chord upward (in the driven direction relative to the screws) away from the double DFL top plates. It will be understood that the orientation of the double DFL top plates and the chord in the tests is similar to their orientation in normal use (FIG. 5). The maximum applied upward load resisted (withdrawal capacity) by the screw 20 was recorded. The results were as follows for the tests conducted:

TABLE 1

| Test Number | Tested Load | | | | Load Duration Factor, $C_d$, for Wind and Siesmic | Allowable Withdrawal Load, $C_d = 1.6$ | |
|---|---|---|---|---|---|---|---|
| | Maximum Load Resisted | | Maximum Load Resisted Divided By Safety Factor of 5 | | | | |
| | lbs | kg | lbs | kg | | lbs | kg |
| 1 | 2276 | 1032 | 455 | 206 | 1.6 | 728 | 330 |
| 2 | 2805 | 1272 | 561 | 254 | 1.6 | 898 | 406 |
| 3 | 2112 | 958 | 422 | 191 | 1.6 | 675 | 306 |
| 4 | 2290 | 1039 | 458 | 208 | 1.6 | 733 | 333 |
| 5 | 2368 | 1074 | 474 | 215 | 1.6 | 758 | 344 |
| 6 | 2615 | 1186 | 523 | 237 | 1.6 | 837 | 379 |
| 7 | 2397 | 1087 | 479 | 217 | 1.6 | 766 | 347 |
| 8 | 2692 | 1221 | 538 | 244 | 1.6 | 861 | 390 |
| 9 | 2694 | 1222 | 539 | 244 | 1.6 | 862 | 390 |
| 10 | 2538 | 1151 | 508 | 230 | 1.6 | 813 | 368 |
| 11 | 2219 | 1007 | 444 | 201 | 1.6 | 710 | 322 |
| 12 | 2619 | 1188 | 524 | 238 | 1.6 | 838 | 381 |
| Average | | | | | | 790 | 358 |

The failure mode for each of the tests was the same: the screw 20 withdrew from the chord (the screw remained secured to and was pulled out of the chord by the top plate). The tests were conducted with double DFL top plates and chords having a specific gravity of 0.50. To convert the maximum load resisted into an allowable withdrawal load for the screw (i.e. the connection strength provided by the screw for building construction purposes), the following formula was used: $L_A = L_R/S_F * C_d$ where $L_A$ is the allowable withdrawal load, $L_R$ is the average load resisted, $S_F$ is the safety factor of 5, and $C_d$ is the load duration factor of 1.6 for wind and seismic.

As seen by Table 1, the screw 20 when installed as shown in FIG. 5 provides significant resistance to the movement of the chord, with an average allowable withdrawal capacity, $L_A$, of 790 lbs (358 kg). From the manufacturer's published literature, comparable screws used in DFL lumber with a specific gravity of 0.50, such as the Simpson SDWC 15600 and FastenMaster FMFF06, have an allowable withdrawal load (withdrawal capacity) of 615 lbs (279 kg) and 655 lbs (297 kg) respectively at a load duration factor, $C_d$, of 1.6. Thus, the screw 20 provides significantly greater withdrawal capacity over comparable screws currently known. Accordingly, screw 20 can be used in wood frame construction in High Velocity Hurricane Zones, without the use of additional fastening or connection components to achieve the required minimum connection strength of 700 lbs.

Figure 4:
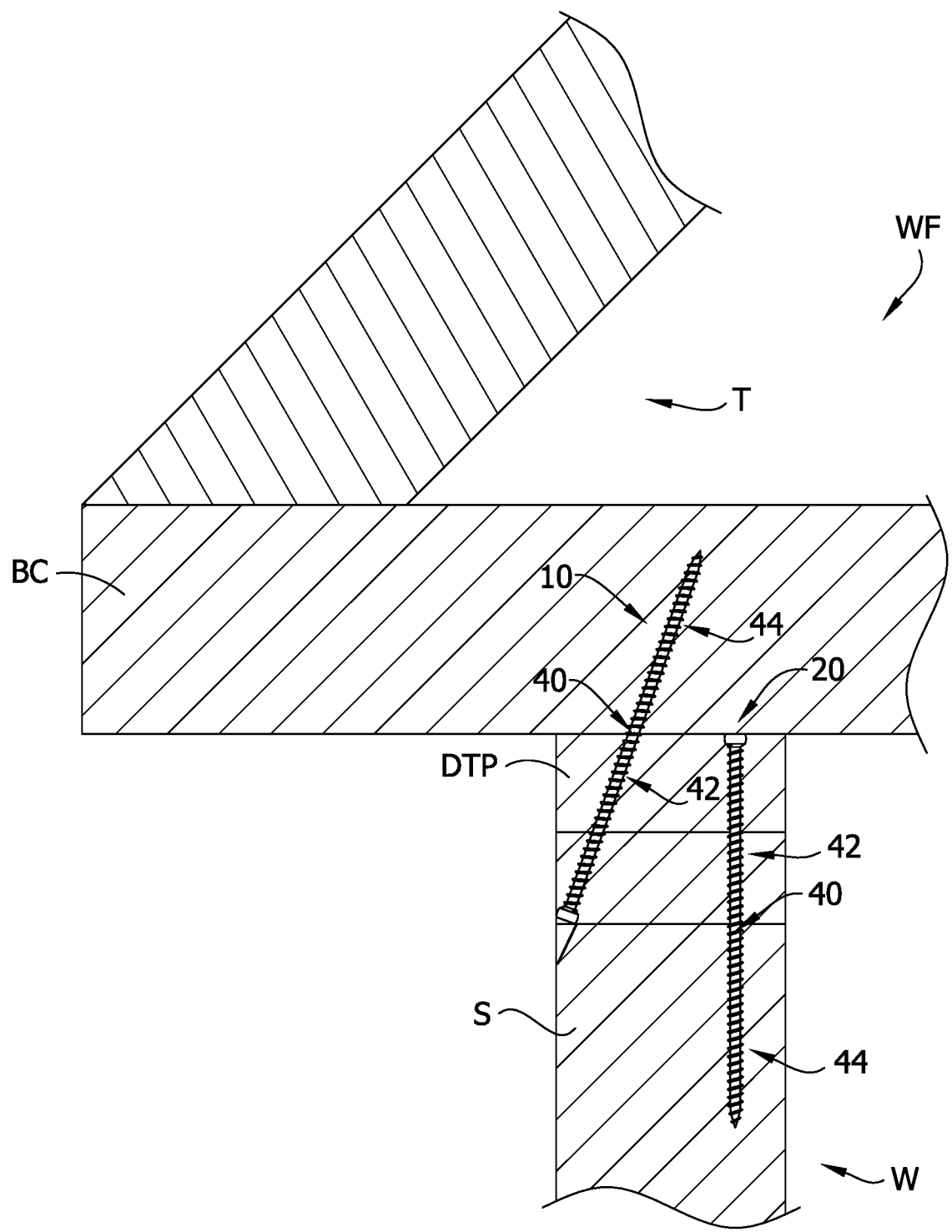
FIG. 4 is a schematic view of multiple screws of FIG. 1 in wood frame construction.

Referring to FIG. 4, multiple screws 20 of the first embodiment of the present disclosure are shown in part of a wood frame structure WF. The wood frame structure WF includes a wood frame wall W and a wooden roof truss T. The wood frame wall W includes a stud S and a double top plate DTP at the top of the stud. The double top plate DTP supports one end of the wooden roof truss T. The screws 20 are shown connecting the double top plate DTP to the bottom chord BC of the roof truss T and the stud S. In this way the screws 20 connect the roof truss T to the wall 4. When the roof truss T aligns with the stud S, the screw 20 connecting the double top plate DTP to the bottom of the roof truss T is installed at an approximate 20° angle, the angle which maximizes the strength of the connection between the top plate and the roof truss. When the roof truss T does not align with the stud S, the screw 20 can be installed in a generally vertical orientation that is orthogonal to the double top plate DTP, as shown in FIG. 5. For the screw 20 connecting the double top plate DTP to the roof truss T, the transition portion 40 is located proximate the intersection of the double top plate and roof truss when the head 24 of the screw engages or contacts the bottom plate of the double top plate DTP. In this position, at least the majority of the first section 42 of asymmetrical thread 30 engages the double top plate and at least the majority of the second section 44 of asymmetrical thread engages the bottom chord BC of the roof truss. For the screw 20 connecting the double top plate DTP to the stud S, the transition portion 40 is located proximate the intersection of the double top plate and stud when the head 24 of the screw engages or contacts the top plate of the double top plate DTP. In this position, at least the majority of the first section 42 of asymmetrical thread 30 engages the double top plate and at least the majority of the second section 44 of asymmetrical thread engages the stud. Accordingly, the increased withdrawal capacity of the screw 20, as described above, provides a stronger connection between the double top plate DTP and the roof truss T and a stronger connection between the double top plate and the stud S. The increased strength of the connection between the double top plate DTP and the roof truss T provided by the screw 20, allows the screw to be used in High Velocity Hurricane Zones without additional connection components. It is to be understood that the wood frame structure WF is illustrative and the screw 20 can be used in other situations than described herein that are within the scope of the present invention.

It will be understood that a reference to the head 24 of the screw 20 engaging or contacting the wooden member means that the screw is driven into the wooden member the prescribed amount for maximum efficacy. Typically, this will mean that the head 24 is flush with the surface of the wooden member. However, the person of ordinary skill in the art recognizes there will be some variation in the position of the head 24 in the wooden member. The double top plate DTP forms part of the anchoring structure (i.e., the wall W) and the truss T is the anchored structure. The pertinent interface is between the anchoring structure and the anchored structure. In this case, the pertinent interface is the interface between the top surface of the top plate of the double top plate DTP and the bottom surface of the bottom chord BC. The bottom plate of the double top plate DTP is engaged by the head 24 of the screw 20 when the screw is driven in the prescribed amount. The top plates constitute a single (wooden) member in this instance.

A method of making the screw 20 includes providing the shaft 22 having the head 24 at a proximal end and the tip 26 at a distal end. The shaft 22 may be preformed with the head 24 and tip 26 or formed after receipt to have these features. The head 24 is configured to receive a driver (e.g., a drill bit, not shown) for driving the screw 20 into the wooden members. An interface location is provided from dimensions of the two members and their relative orientation when connected together. Referring to FIG. 4, the connection of the double top plate DTP to the truss T is a standard connection that is made over and over again. The dimensions of the components of the double top plates is known. For example, where the double top plate DTP is formed by two 2×4's the dimensions are well established. Moreover, the amount by which the screw 20 should penetrate into the bottom chord is also known by those of ordinary skill in the art. The angle of inclination of the screw 20 into the double top plate DTP and bottom chord BC is also known. Therefore, it is possible to determine the length along the path at which the screw 20 should be driven into the double top plate DTP and bottom chord at which the upper plate of the double top plate interfaces with the bottom chord BC. For example, this distance may be about three inches. Having established to the location of the interface, the asymmetrical thread 30 is formed on the shaft 22 so that the transition portion 40 is located where the interface between the upper plate of the double top plate DTP meets the bottom chord BC. Thus, the transition portion 40 is positioned according to the interface location so that upon driving the screw into the two members so that the head contacts one of the two members (e.g., the bottom surface of the bottom plate of the double top plate DTP, the transition portion is proximate the interface location. As used in this application, "proximate" also includes being located precisely at the interface location. However, it is well understood that in the construction industry there will be some variation in both the angle of the screw 20 and the depth to which it is driven, so that the transition portion 40 will not usually coincide exactly with the interface.

In view of the above, it will be seen that the several features of the invention are achieved and other advantageous results obtained.

Having described the invention in detail, it will be apparent that modifications and variations are possible without departing from the scope of the invention defined in the appended claims.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above products without departing from the scope of the invention, it is intended that all matter contained in the above description and shown in the accompanying drawings shall be interpreted as illustrative and not in a limiting sense.

What is claimed is:

1. An asymmetrical screw for securing two wooden members together so that the wooden members meet at an interface through which the screw extends, the screw comprising:
   a shaft with a proximal end and a distal end;
   a head at the proximal end of the shaft, the head configured to accept a tool to rotate the shaft;
   a tip at the distal end of the shaft; and
   a continuous asymmetrical thread on the shaft having a front surface facing the tip and a rear surface facing the head, the front and rear surfaces each having an angle relative to a plane normal to the shaft, the asymmetrical thread including a first section including a portion of the thread having front and rear surfaces of first angles with respect to the plane normal to the shaft, a second section including a portion of the thread having front and rear surfaces of second angles different than the corresponding first angles of the first section of the thread, and a transition portion between the first and second sections, the transition portion being positioned along the shaft such that the transition portion is located proximate the interface of the two wooden members when the screw secures the wooden members together and the head of the screw engages a first of the wooden members.

2. The asymmetrical screw of claim 1, wherein when the screw secures the wooden members together and the head of the screw engages the first of the wooden members, at least a majority of the thread portion of the first section of the thread is disposed within the first of the wooden members and at least a majority of the thread portion of the second section of the thread is disposed within a second of the wooden members.

3. The asymmetrical screw of claim 1, wherein the thread portion of the first section is located nearer to the head of the screw and the thread portion of the second section is located nearer to the tip of the screw.

4. The asymmetrical screw of claim 1, wherein the angle of the rear surface in the first section is greater than the angle of the front surface in the first section, and the angle of the front surface in the second section is greater than the angle of the rear surface in the second section.

5. The screw of claim 1, wherein the transition portion is located closer to the tip than the head.

6. The screw of claim 1, wherein the transition portion is located at least about ¼ of a total length of the screw from the tip.

7. The screw of claim 6, wherein the transition portion is located at least about ¼ of the total length of the screw from the proximal end of the screw including the head.

8. The screw of claim 7, wherein the transition portion is located at least about ⅓ of the total length of the screw from the tip.

9. The screw of claim 8, wherein the transition portion is located at least about ½ of the total length of the screw from the tip.

10. The screw of claim 1, wherein the transition portion is located closer to the head than the tip.

11. The screw of claim 1, wherein the transition portion is located at least about 1.5 inches from the tip.

12. The screw of claim 1, wherein the transition portion is located at least about 3 inches from the tip.

13. The screw of claim 1, wherein the angle of the rear surface in the second section is equal to or less than 20 degrees.

14. The screw of claim 1, wherein the angle of the front surface in the first section is equal to or less than 20 degrees.

15. The screw of claim 1, wherein the angle of the front surface in the second section is between 20 degrees and 40 degrees.

16. The screw of claim 1, wherein the angle of the rear surface in the first section is between 20 degrees and 40 degrees.

17. The screw of claim 1, wherein the withdrawal load capacity of the screw is equal to or greater than 700 pounds.

18. The screw of claim 1, wherein the first section of asymmetrical threads extends onto the tip.

* * * * *